United States Patent
Cherubini et al.

(10) Patent No.: US 9,633,681 B1
(45) Date of Patent: Apr. 25, 2017

(54) HIGH-RATE SKEW ESTIMATION

(71) Applicant: International Business Machines Corporation, Armonk, NY (US)

(72) Inventors: Giovanni Cherubini, Rueschlikon (CH); Simeon Furrer, Altdorf (CH); Robert A. Hutchins, Tucson, AZ (US); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/933,977

(22) Filed: Nov. 5, 2015

(51) Int. Cl.
 *G11B 5/58* (2006.01)
 *G11B 5/588* (2006.01)

(52) U.S. Cl.
 CPC .................. *G11B 5/588* (2013.01)

(58) Field of Classification Search
 None
 See application file for complete search history.

(56) References Cited

U.S. PATENT DOCUMENTS

| | | | |
|---|---|---|---|
| 7,742,254 B2 | 6/2010 | Cherubini et al. | |
| 7,957,088 B1 | 6/2011 | Bui et al. | |
| 7,961,421 B1 * | 6/2011 | Bui | G11B 5/584 360/76 |
| 8,094,402 B2 | 1/2012 | Bui et al. | |
| 8,643,975 B2 * | 2/2014 | Cherubini | G11B 5/56 360/76 |
| 8,780,486 B2 * | 7/2014 | Bui | G11B 5/584 360/76 |
| 9,058,828 B1 | 6/2015 | Cherubini et al. | |
| 9,218,839 B2 * | 12/2015 | Cherubini | G11B 5/584 |
| 2015/0131180 A1 | 5/2015 | Cherubini et al. | |

OTHER PUBLICATIONS

Argumedo et al., "Scaling tape-recording areal densities to 100 Gb/in2," 2008 IBM, IBM Journal of Research & Development, vol. 52, No. 4/5, Jul./Sep. 2008, pp. 513-527.

* cited by examiner

*Primary Examiner* — K. Wong
(74) *Attorney, Agent, or Firm* — Zilka-Kotab, PC (57) ABSTRACT

In one embodiment, a method includes computing more than one skew estimate within each timing-based servo (TBS) frame. Each skew estimate is related to an estimated position of a magnetic tape read head in relation to a magnetic tape medium. In another embodiment, a system includes a hardware processor and logic integrated with and/or executable by the hardware processor. The logic is configured to cause the hardware processor to compute an initial skew estimate based on longitudinal position (LPOS) sync-pattern detection flags detected using servo channels which process at least two readback signals, with the proviso that the LPOS sync-pattern detection flags are only used to compute the initial skew estimate. The logic is also configured to compute more than one skew estimate within each TBS frame thereafter, each skew estimate being related to an estimated position of a magnetic tape read head in relation to a magnetic tape medium.

20 Claims, 8 Drawing Sheets

HIGH-RATE SKEW ESTIMATION

BACKGROUND

The present invention relates to tape storage systems, and more specifically, to a high rate skew estimation for use in tape drives.

Timing-based servo (TBS) is a technology developed specifically for linear tape drives in the late 1990s. In TBS systems, recorded servo patterns include transitions with two different azimuthal slopes. An estimate of the head lateral position is derived from the relative timing of pulses generated by a servo reader reading the servo pattern.

Figure 3:
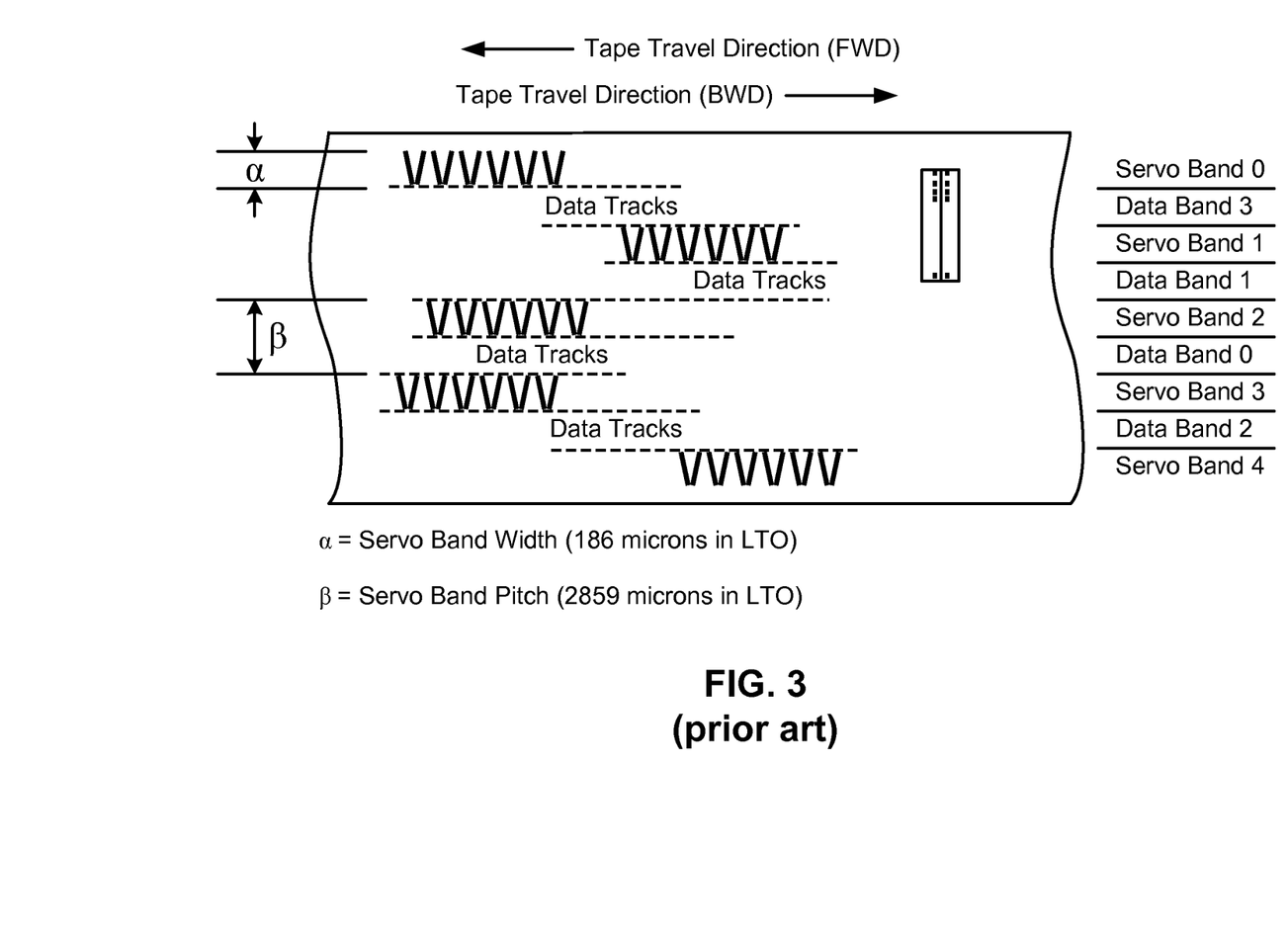
FIG. 3 illustrates a tape layout in accordance with the prior art.

In a TBS format, the servo patterns are prerecorded in several bands distributed across the tape, typically five or nine bands. Data is recorded in the regions located between pairs of servo bands. FIG. 3 illustrates the tape layout for five servo bands and four data bands, as specified in the linear tape-open (LTO) format and IBM Enterprise format. In read/write heads of IBM LTO and Enterprise tape drives, two servo readers are normally available per head module, from which longitudinal position (LPOS) information as well as a position error signal (PES) may be derived. Optimum detection of the TBS patterns is achieved by a synchronous servo channel employing a matched-filter interpolator/correlator, which ensures optimum filtering of the servo reader signal.

In drives using flanged rollers to guide the tape being transported from a supply reel to a take-up reel, the flanges limit the motion of the tape, but introduce a probability of debris accumulation on the tape. This debris accumulation over time impacts the lifetime of the tape and creates undesirable dynamic effects, namely high-frequency lateral tape motion (LTM).

One solution to this problem is to remove the roller flanges. By removing the roller flanges there is less constraint on the motion of the tape. Consequently, lateral tape motion is more pronounced, leading to large tape-to-head skew, but occurring at a significantly lower frequency than the LTM originated by debris accumulation, thus facilitating the task of a track-following system. To compensate for the skew resulting from LTM, skew-following actuation is used to keep the head perpendicular to the tape with a skew-following loop, and to enable read while write verification with a single track following actuator with two degrees of freedom and a multi-module write/read head.

Figure 4:
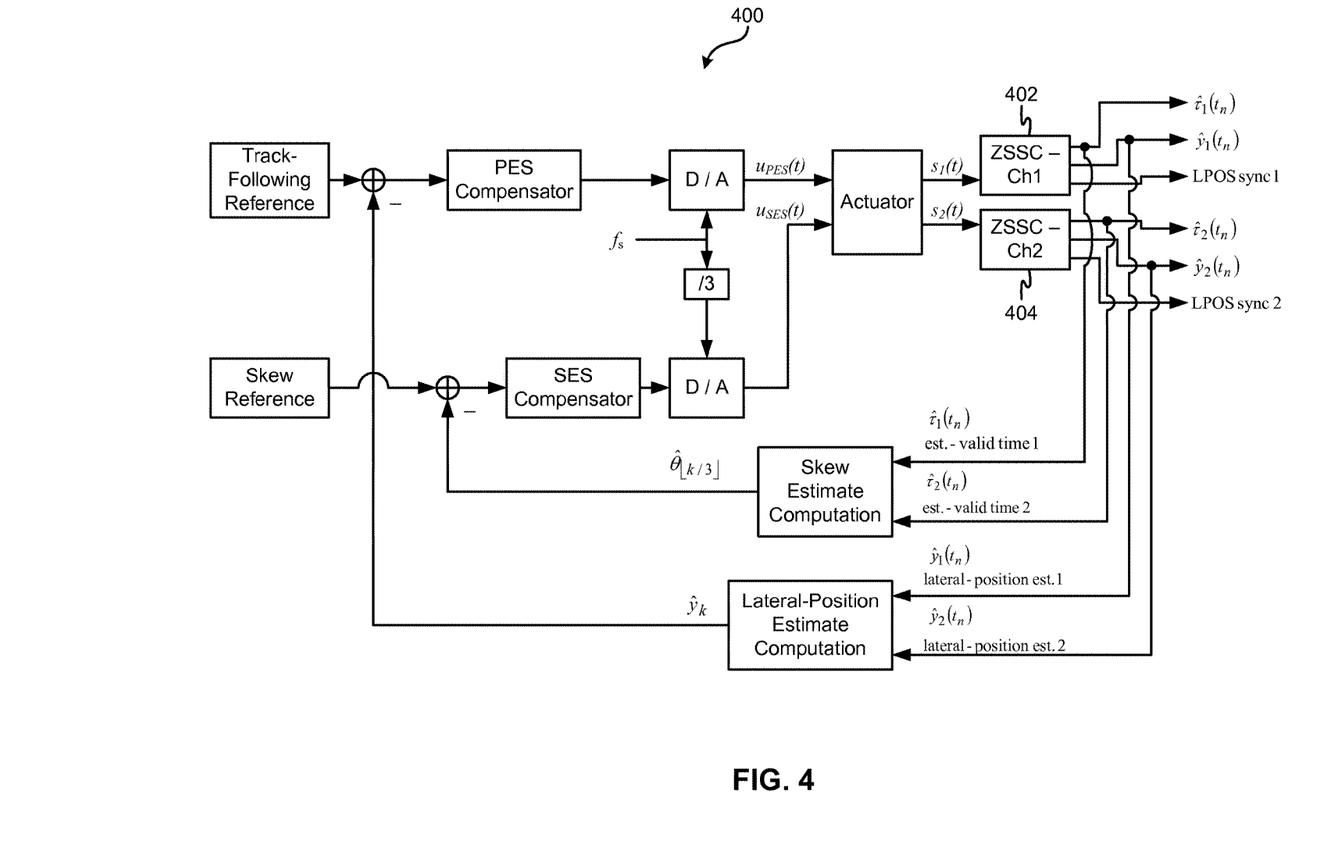
FIG. 4 shows a block diagram of a joint track-following and skew-following servo system, according to one embodiment.

One conventional method for the computation of a skew error signal (SES), which is defined as the difference between the actual skew and a reference skew, relies on the timing information that is provided by the peaks of the correlation signals, which are generated by two synchronous servo channels receiving readback signals from the two servo readers that read TBS patterns on adjacent servo bands. The method requires bringing the initial skew error signal for the skew-following loop to within a value of ±d equivalent to half a servo frame, corresponding, for example, to ±76 µm for one particular TBS servo format. This is possible due to the sequences of synchronization symbols that are encoded in the TBS patterns, interspersed with the LPOS symbols, and usually referred to as LPOS sync patterns. The LPOS sync patterns are the same in each servo band, as defined in both the LTO and IBM enterprise servo formats. For the purpose of initial alignment of the skew, so that the skew error is within ±d, the LPOS sync-pattern detection flags, which are generated by the two servo channels every 36 servo frames, are used to estimate the absolute skew. The block diagram of a joint track-following and skew-following servo system using dual synchronous servo channels is shown in FIG. 4. The operation of the skew-following loop, however, cannot rely solely on the presence of the LPOS sync patterns for the estimation of the skew, as the rate of generation of skew estimates would be too low.

In this conventional method the skew estimate is obtained from the difference of the arrival times of correlation peaks, which correspond to dibits occupying the same position in the [4 4 5 5] sequences of dibits in the two adjacent servo bands. However, during normal operation of the skew-following loop, there is an inherent ambiguity equivalent to the length of a servo frame, e.g., 152 µm for one servo format. This ambiguity arises from the skew estimate being obtained as the difference of the arrival times of correlation peaks, which correspond to dibits occupying the same position in the [4 4 5 5] sequences of dibits in the two adjacent servo bands, without distinguishing whether they belong to two servo frames encoding the same LPOS symbol or different LPOS symbols.

This ambiguity leads to a drawback where a reliable skew estimate is limited to the interval [−d, d], and that controlling the skew to values around ±d µm+K×2d µm, where K is an integer, poses a serious challenge, as the measured skew during skew-following might toggle between values around +d and −d. In case a perfect alignment between servo readers and servo frames is required, i.e., the head is to be kept perpendicular to the tape, the skew is controlled to around zero and the above mentioned ambiguity does not represent a problem.

In future tape drive generations, however, reliable read-after-write operation in the presence of offsets in the alignment of the head modules, as well as tape dimensional stability considerations, and track-following disturbances arising from compressional tape vibration modes, will dictate implementations of the skew-following loop, for which the reference skew for skew-following control may be in a wide range of values, well beyond the conventional limits of ±d. Furthermore, the conventional method leads to the generation of only one skew estimate per servo frame, which is not sufficient to adequately suppress coupling effects between skew- and track-following loops, and to avoid non-negligible estimation delays in skew-following control loops.

Therefore, a robust and reliable skew estimation method that allows skew-following control with skew reference values that may be selected in a wide range, and high rate of generation of skew estimates that are not limited to the interval [−d, d] would be highly beneficial.

SUMMARY

In one embodiment, a tape drive includes a magnetic tape read head providing at least two readback signals and a controller including a processor and logic integrated with and/or executable by the processor. The logic is configured to compute more than one skew estimate within each timing-based servo (TBS) frame, each skew estimate being related to an estimated position of the magnetic tape read head in relation to a magnetic tape medium.

In another embodiment, a method includes computing more than one skew estimate within each TBS frame. Each skew estimate is related to an estimated position of a magnetic tape read head in relation to a magnetic tape medium.

In another embodiment, a system includes a hardware processor and logic integrated with and/or executable by the hardware processor. The logic is configured to cause the hardware processor to compute an initial skew estimate based on longitudinal position (LPOS) sync-pattern detection flags detected using servo channels which process at least two readback signals, with the proviso that the LPOS sync-pattern detection flags are only used to compute the initial skew estimate. The logic is also configured to compute more than one skew estimate within each TBS frame thereafter, each skew estimate being related to an estimated position of a magnetic tape read head in relation to a magnetic tape medium.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for generating high-rate skew estimates for skew-following control, with skew reference values that may be selected in a wider range than conventional methods.

In one general embodiment, a tape drive includes a magnetic tape read head providing at least two readback signals and a controller including a processor and logic integrated with and/or executable by the processor. The logic is configured to compute more than one skew estimate within each timing-based servo (TBS) frame, each skew estimate being related to an estimated position of the magnetic tape read head in relation to a magnetic tape medium.

In another general embodiment, a method includes computing more than one skew estimate within each TBS frame. Each skew estimate is related to an estimated position of a magnetic tape read head in relation to a magnetic tape medium.

In yet another general embodiment, a system includes a hardware processor and logic integrated with and/or executable by the hardware processor. The logic is configured to cause the hardware processor to compute an initial skew estimate based on longitudinal position (LPOS) sync-pattern detection flags detected using servo channels which process at least two readback signals, with the proviso that the LPOS sync-pattern detection flags are only used to compute the initial skew estimate. The logic is also configured to compute more than one skew estimate within each TBS frame thereafter, each skew estimate being related to an estimated position of a magnetic tape read head in relation to a magnetic tape medium.

Figure 1:
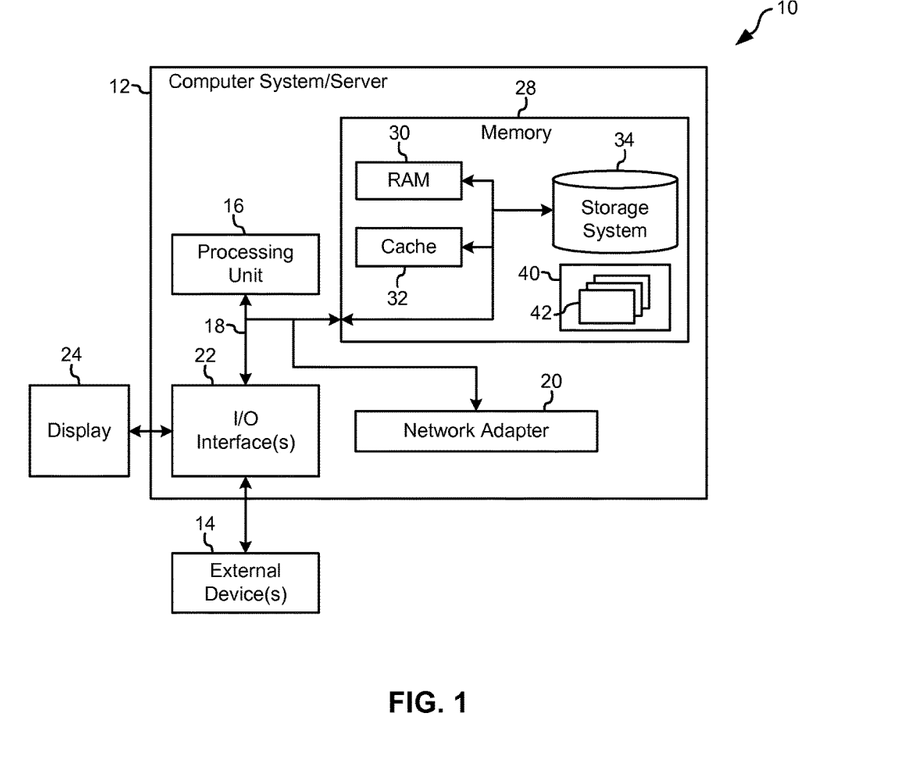
FIG. 1 illustrates a network storage system, according to one embodiment.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 2:
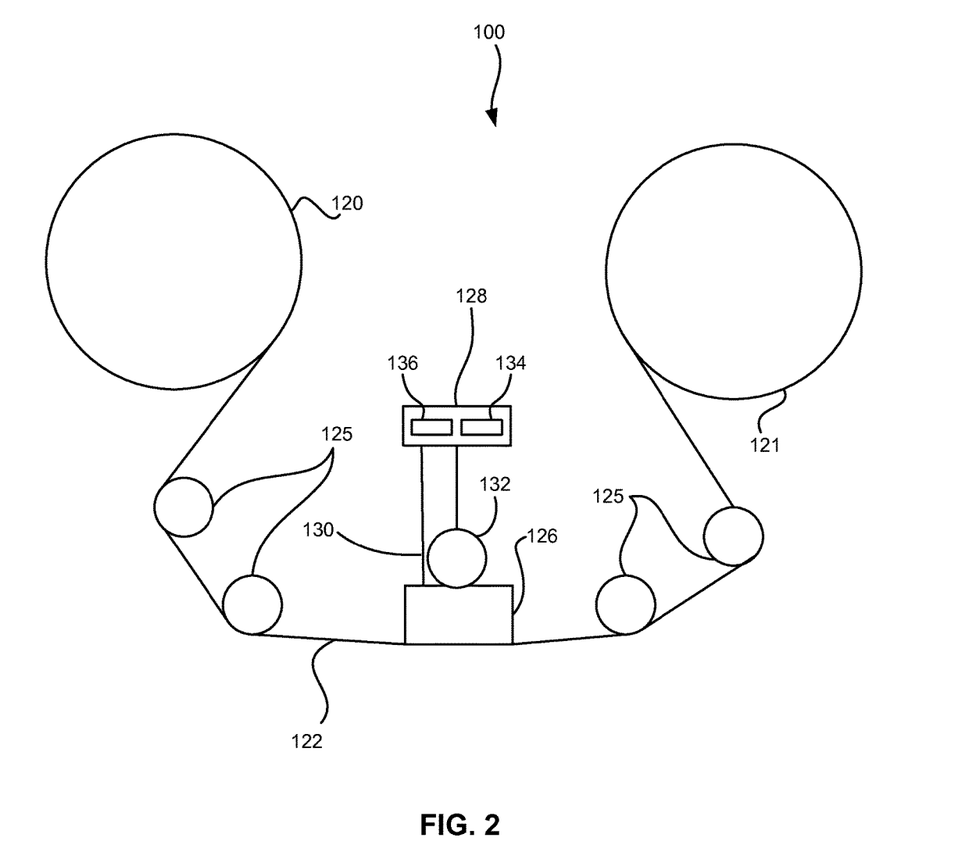
FIG. 2 illustrates a simplified tape drive of a tape-based data storage system, according to one embodiment.

FIG. 2 illustrates a simplified tape drive 100 of a tape-based data storage system, which may be employed in the context of the present invention. While one specific implementation of a tape drive is shown in FIG. 2, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive 100 may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Now referring to FIG. 4, a block diagram of a joint track-following and skew-following servo system 400 using dual synchronous servo channels is shown according to one embodiment. In this system 400, high-rate skew estimates may be generated for skew-following control, with skew reference values that may be selected in a range of $[-\lambda, \lambda]$, where $\lambda$ denotes a limit greater than half a servo frame (d).

A skew estimate, for the sake of these descriptions, is defined as a sum of an integer part given by an integer number of servo frame lengths, and a fractional part given by a term in a range of $[-d, d]$. This method of skew estimation overcomes the range limitation problem described previously. The computation of a skew estimate takes place within a time window, which is obtained by taking output from one of the two available servo channels 402, 404 as a reference.

Then, the values assumed by the counters mod-18 for counting the dibit correlation peaks of the [4 4 5 5] TBS pattern in the servo channels 402, 404 are monitored to determine proper time instants for the computation of the skew estimates. With this approach, up to four skew estimates may be generated per servo frame, i.e., one per servo burst. This corresponds to an increase of up to a factor of four in the rate of generation of skew estimates with respect to conventional methods.

Figure 5:
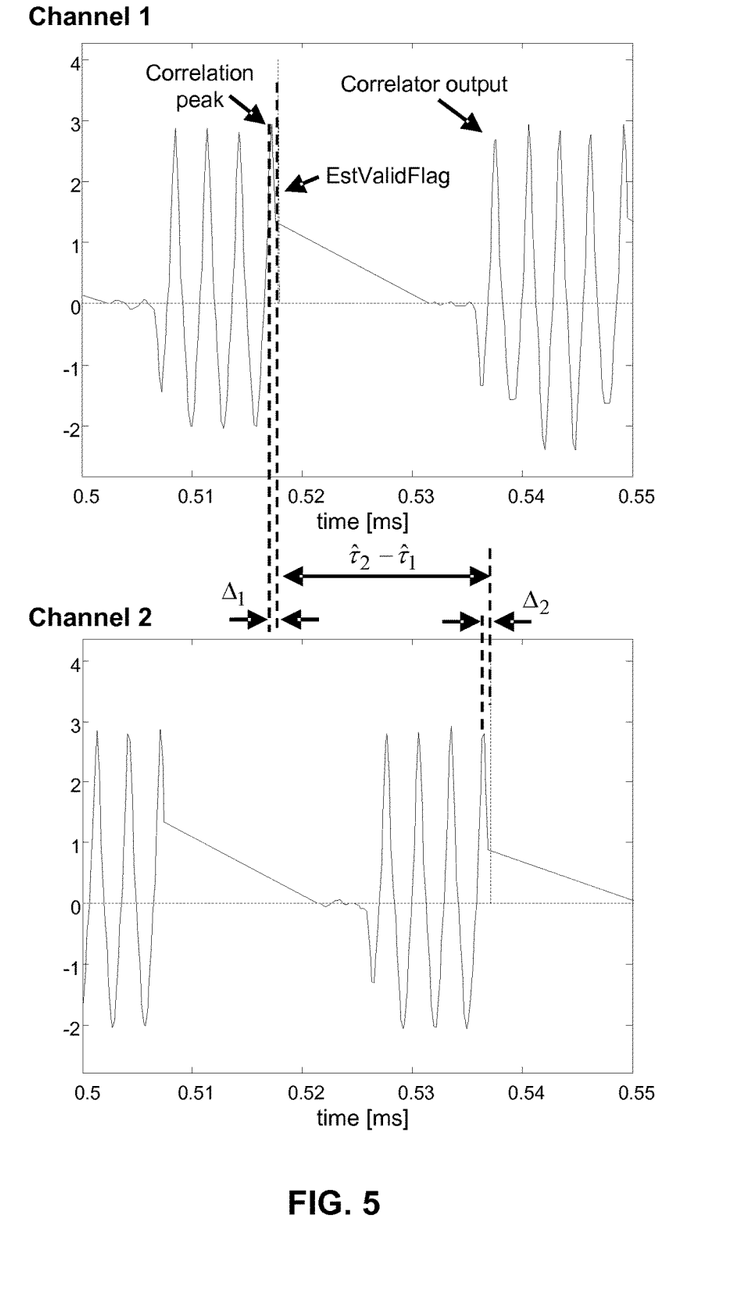
FIG. 5 shows skew estimates obtained by measuring a shift between servo bursts in readback signals, according to one embodiment.

In one embodiment, a skew estimate is obtained by measuring the shift between servo bursts in the readback signals $s_1(t)$ and $s_2(t)$ from the two servo readers that read TBS patterns on adjacent servo bands of the magnetic tape. In a further embodiment, the skew estimate is accurately obtained by the timing information that is provided by the peaks of the correlation signals generated by the synchronous servo channels 402, 404 receiving the readback signals $s_1(t)$ and $s_2(t)$, as shown in FIG. 5.

Referring again to FIG. 4, a skew estimate, $\hat{\Theta}$, may be computed, in one embodiment, from the time instants $\hat{\tau}_1, \hat{\tau}_2$, at which the correlation peaks are observed by the dual servo channels 402, 404, according to Equation 1.

$$\hat{\Theta} = \hat{v}(\hat{\tau}_2 - \hat{\tau}_1 + \Delta_1 - \Delta_2)$$  Equation 1

In Equation 1, $\hat{v}$ denotes the tape velocity estimate, $\hat{\tau}_2$ and $\hat{\tau}_1$ denote the time instants at which the estimate-valid flags indicating the detection of correlation peaks from corresponding servo bursts are generated, and the correction terms $\Delta_2$ and $\Delta_1$ denote the time difference between time instants at which the peaks of the correlation signal and the estimate-valid flags occur on servo channel 404 and servo channel 402, respectively. The correction terms $\Delta_2$ and $\Delta_1$ are available from the synchronous servo channels 404, 402, which very accurately determine the arrival times of the correlation signal peaks to compute the lateral-position estimates. The skew error used for skew compensation in the loop of FIG. 4 is given by Equation 2.

$$\Theta_{err} = \hat{\Theta} - \hat{\Theta}_{ref}$$  Equation 2

In Equation 2, in one example for legacy LTO drives, the length of half a servo frame is d=100 μm, and $\Theta_{ref} \in \{\pm 33 \text{ μm}, \pm 66 \text{ μm}\}$ depends on the servo bands spanned by the head module, or $\Theta_{ref} = 0$ for some drive configurations, such as the IBM enterprise drives.

As mentioned earlier, in the conventional skew estimation method, there is an inherent ambiguity equivalent to the length, 2d, of a servo frame. A skew estimate is obtained from the difference of the arrival times of the correlation peaks, corresponding to dibits occupying the same position in the [4 4 5 5] sequences of dibit servo bursts from the two adjacent servo bands. The ambiguity arises from corresponding servo bursts being selected in the readback signals without distinguishing whether they belong to two servo frames encoding the same LPOS symbol, or different LPOS symbols, as illustrated in FIG. 5.

Figure 6:
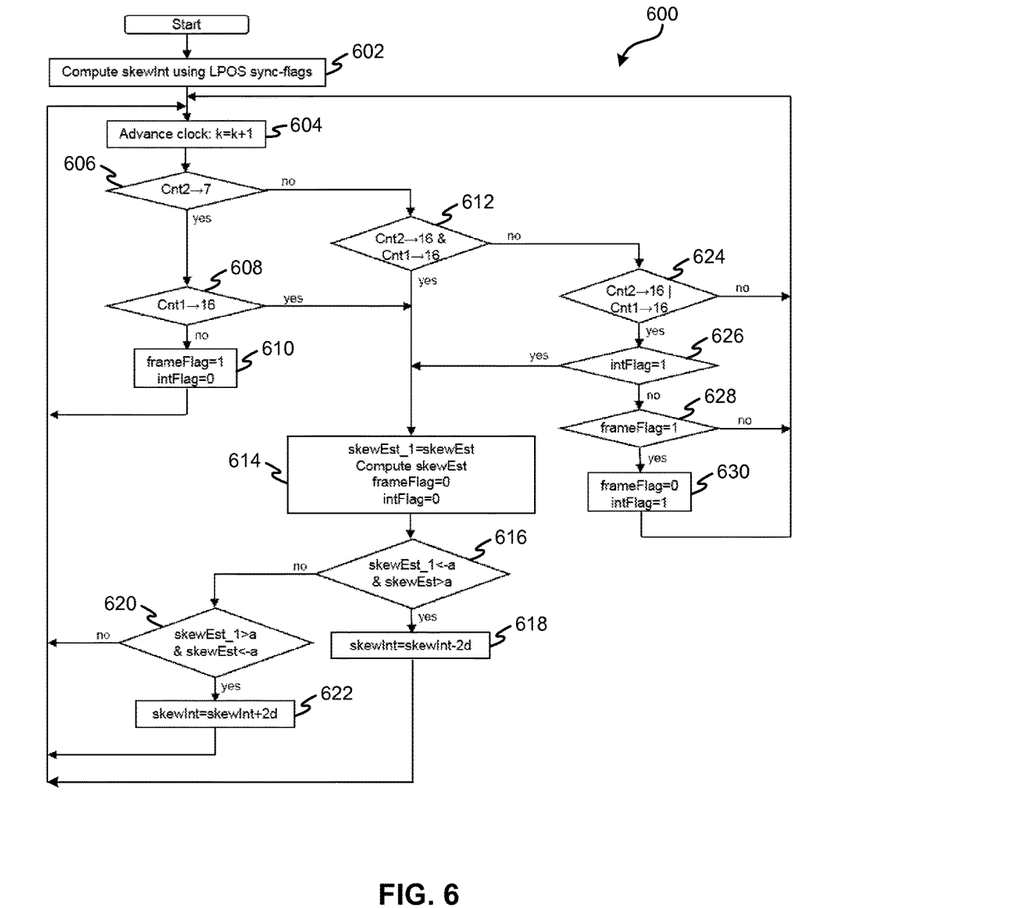
FIG. 6 shows a flowchart of a method according to one embodiment.

To solve this ambiguity, a method for skew estimation is presented with reference to the flowchart shown in FIG. 6, according to one embodiment.

FIG. 6 shows a flowchart of a method 600 according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, a tape drive, a controller, or some other device having one or more processors therein. The processor, e.g., processing circuit(s), chip(s), and/or module(s) implemented in hardware and/or software, and preferably having at least one hardware component, may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

For the description of method 600, consider the i-th skew estimate $s_i$, expressed as the sum of an integer and a fractional part, i.e., $s_i = n_i \times 2d + \mu_i$, where $\mu_i$ denotes the fractional part in the interval [−d, d], and $n_i$ denotes the number of integer servo frame lengths, with d being half a servo frame length.

As shown in FIG. 6, method 600 may initiate with operation 602, where an initial integer part of the skew value, $n_i$ (skewInt), is estimated using LPOS sync-pattern detection flags. These LPOS sync-pattern detection flags may be provided by two servo channels processing readback servo signals obtained from a magnetic tape read head of a tape drive, or some other component of a tape drive configured to provide such flags. The initial skew value is estimated quickly to be used in subsequent operations.

In operation 604, a clock is advanced, with a time value of the clock being represented by k, such that the clock is advanced by incrementing k by one, i.e., k=k+1. Then, at each clock interval kT, where T denotes the period of the clock provided to the two servo channels, the values achieved by two counters, counter 1 (Cnt1) associated with servo channel 1, and counter 2 (Cnt2) associated with servo channel 2 are checked to determine their values. The counters are modulo-18, and they are checked to determine whether a new correlation peak is detected.

In operation 606, it is determined whether Cnt2 is equal to 7. In response to Cnt2 being equal to 7, method 600 continues to operation 608; otherwise, in response to Cnt2 not being equal to 7, method 600 moves to operation 612.

In operation 608, it is determined whether Cnt1 is equal to 16. In response to Cnt1 being equal to 16, method 600 continues to operation 614; otherwise, in response to Cnt1 not being equal to 16, method 600 moves to operation 610.

In operation 610, the observation frame flag is set to one, e.g., frameFlag=1, indicating that a new observation frame has started. The observation frame flag is set to one in response to the value of Cnt2 increasing from 6 to 7, indicating that the third dibit in the second burst of the [4 4 5 5] sequence of dibits within a frame has been detected on servo channel 2.

During an observation frame, monitoring of Cnt1 and Cnt2 continues to detect the increase of at least one of the two counter values from 15 to 16, indicating that the third dibit in the fourth burst of the [4 4 5 5] sequence of dibits within a frame has been detected.

In operation 612, it is determined whether both of Cnt1 and Cnt2 are equal to 16. In response to both of Cnt1 and Cnt2 being equal to 16, method 600 continues to operation 614; otherwise, in response to both of Cnt1 and Cnt2 not being equal to 16, method 600 moves to operation 624.

In operation 614, a previous fractional skew estimate (skewEst_1) is replaced by the last computed fractional skew estimate (skewEst), and then a new fractional skew estimate (skewEst) is computed, as described herein according to various embodiments. Also, the transition of both the second counter (Cnt2) and the first counter (Cnt1) from 15 to 16 within the observation frame leads to the reset of both the measurement interval flag and the observation frame flag (intFlag=0 and frameFlag=0).

Also, in response to, in the same clock interval, the Cnt2 increasing from 6 to 7 and the Cnt1 increasing from 15 to 16, or both Cnt1 and Cnt2 increasing from 15 to 16, a new fractional skew estimate (skewEst) is immediately computed without starting a new observation frame or measurement interval.

In operation 616, it is determined whether the previous skew estimate (skewEst_1) is less than a negative threshold value (−a) and whether the current skew estimate (skewEst) is greater than the positive threshold value (a). This condition indicates that the variation between two consecutive skew estimates is larger in absolute value than twice the threshold value, 2a. Twice the threshold value, in one embodiment, may be set to be about equal to a distance equal to a quarter of a servo frame, i.e., 2a~d. In response to the difference between two consecutive skew estimates being larger than twice the threshold value with the previous estimate being less than the current estimate, method 600 continues to operation 618; otherwise, in response to the difference between two consecutive skew estimates not being larger than twice the threshold value, method 600 proceeds to operation 620.

In operation 618, the initial integer part of the skew value (skewInt) is reduced by a length of a servo frame (2d), i.e., skewInt=skewInt −2d. Then, method 600 returns to operation 604 to advance the clock and again determine if a new correlation peak is detected.

In operation 620, it is determined whether the previous skew estimate (skewEst_1) is greater than the positive threshold value (a) and whether the current skew estimate (skewEst) is less than a negative threshold value (−a). This condition indicates that the difference between two consecutive skew estimates is larger in absolute value than twice the threshold value, 2a, but with a negative sign. Twice the threshold value, in one embodiment, may be set to be about equal to a distance equal to a quarter of a servo frame, i.e., 2a~d. In response to the difference between two consecutive skew estimates being larger in absolute value than twice the threshold value with the previous estimate being greater than the current estimate, method 600 continues to operation 622; otherwise, in response to the difference between two consecutive skew estimates not being larger in absolute value than twice the threshold value, method 600 returns to operation 604.

In operation 622, the initial integer part of the skew value (skewInt) is increased by a length of a servo frame (2d), i.e., skewInt=skewInt+2d. Then, method 600 returns to operation 604 to advance the clock and again determine if a new correlation peak is detected.

In operation 624, it is determined whether either counter (Cnt1 or Cnt2) has transitioned from 15 to 16 within an observation frame. In response to either Cnt1 or Cnt2 being equal to 16, method 600 continues to operation 626; otherwise, in response to neither Cnt1 nor Cnt2 being equal to 16, method 600 returns to operation 604 to advance the clock and again determine if a new correlation peak is detected.

In operation 626, it is determined whether the interval flag (intFlag) is equal to one, i.e., intFlag=1. In response to a determination that the interval flag is equal to one, method 600 moves to operation 614; otherwise, in response to the interval flag not being equal to one, method 600 continues to operation 628.

In operation 628, it is determined whether the observation frame flag (frameFlag) is equal to one, i.e., frameFlag=1. In response to a determination that the observation frame flag is equal to one, method 600 continues to operation 630; otherwise, in response to the observation frame flag not being equal to one, method 600 returns to operation 604 to advance the clock and again determine if a new correlation peak is detected.

Detection of a first transition of either counter value from 15 to 16 within an observation frame while frameFlag=1 causes a measurement interval to start, indicated by setting the interval flag equal to one, i.e., intFlag=1, and setting the observation frame flag to zero, i.e., frameFlag=0. This is shown in operation 630. This is performed in response to either counter (Cnt1 or Cnt2) transitioning to 16 within the observation frame, the intFlag not equaling one (the condition of operation 626), and the frameFlag equaling one (the condition of operation 628).

According to one embodiment, in response to a variation, $\Delta$, between the fractional parts of two consecutive skew estimates (skewEst_1 and skewEst) being larger in absolute value than a threshold, 2a, with 2a being equal to approximately d, e.g., 2a~d, and d being equal to half a servo length, the integer part of the last skew estimate is modified by a term equal to $-2d \times \text{sign}(\Delta)$.

Figure 7A:
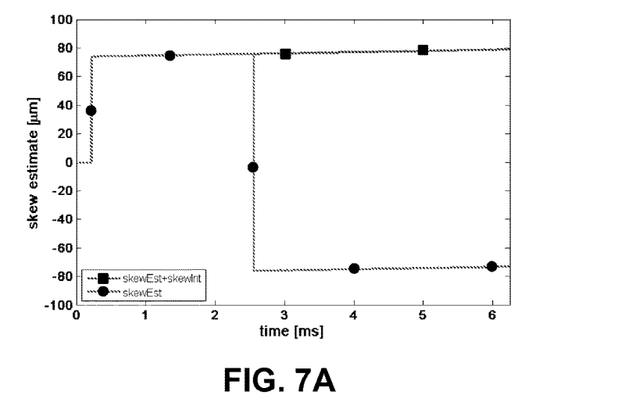
FIGS. 7A-7C show simulation results when applying skew estimation techniques described herein according to various embodiments.
Figure 7B:
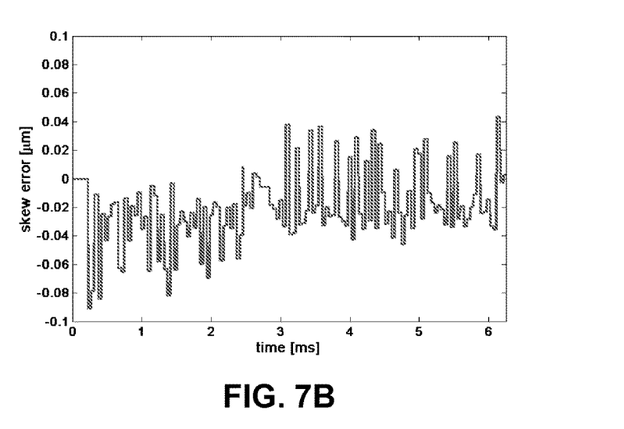
Figure 7C:
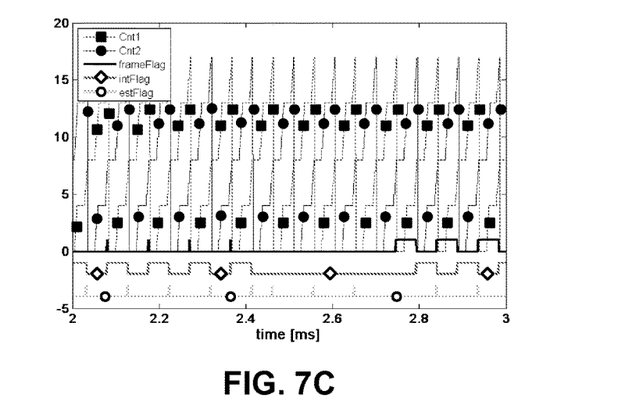

Simulation results illustrating this method applied to a drive reading a tape with a TBS servo format characterized by a servo frame length 2d=152 μm and an azimuth angle α=12 degrees, a tape velocity of 1.8 m/s, servo channel signal-to-noise ratio (SNR) of 24.7 dB, and open-loop skew estimation are shown in FIGS. 7A-7C.

FIG. 7A shows skew estimates highlighting the inclusion of the integer part of the skew estimate. As can be seen in FIG. 7A, the skew estimate without the integer part of the skew estimate, i.e., the fractional part only (skewEst), jumps from the value of d=76 μm to the value of d=−76 μm when the integer part of the skew estimate is not included. In contrast, the skew estimate with the integer part of the skew estimate included (skewEst+skewInt) is continuous across the boundary value of d=76 μm for the extent of the time shown in FIG. 7A.

FIG. 7B shows the estimation error, which is equal to the actual skew minus the estimated skew. FIG. 7C shows the evolution of the relevant variables in the time interval near the crossing of a boundary corresponding to a skew equal to d. The variable "estFlag" indicates the instants at which skew estimates are computed, and the variable "Cnt2" is the reference signal.

Figure 8:
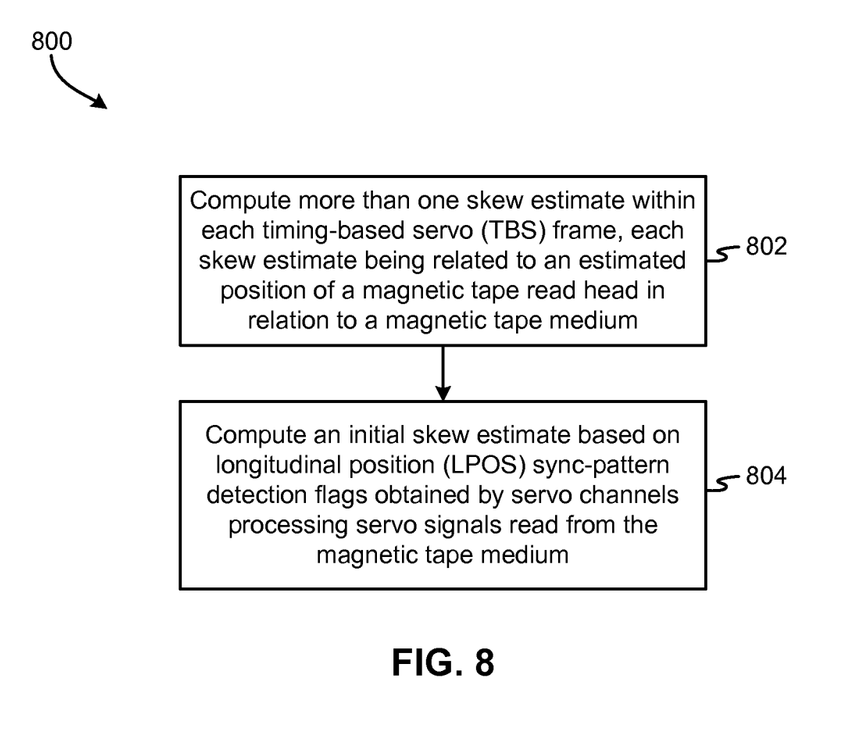
FIG. 8 shows a flowchart of a method according to one embodiment.

Now referring to FIG. 8, a method 800 for providing skew estimates is shown according to one embodiment. The method 800 may be performed in accordance with the present invention in any of the environments depicted in FIGS. 1-5, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a processor, a tape drive, a controller, or some other device having one or more processors therein. The processor, e.g., processing circuit(s), chip(s), and/or module(s) implemented in hardware and/or software, and preferably having at least one hardware component, may be utilized in any device to perform one or more steps of the method 800. Illustrative processors include, but are not limited to, a CPU, an ASIC, a FPGA, etc., combinations thereof, or any other suitable computing device known in the art.

As shown in FIG. 8, method 800 may initiate with operation 802, where more than one skew estimate is computed within each TBS frame. Each skew estimate is related to an estimated position of a magnetic tape read head in relation to a magnetic tape medium. Conventional methods are limited to computing only one skew estimate per servo frame, but according to method 800, more than one skew estimate is computed within each TBS frame, thereby providing enhanced precision in track and skew-following.

In one embodiment, the more than one skew estimate may be computed based on the observation of the peaks of correlation signals generated by synchronous servo channels receiving readback signals from a magnetic tape read head. The value of each skew estimate is given by the sum of a fractional part and an integer part. The value of the integer part of a skew estimate is obtained by the observation of boundary crossings.

In one approach, a boundary crossing occurs each time an absolute value of a difference between two consecutive fractional parts of skew estimates is equal to or larger than a servo frame length (2d), signifying a crossing of a boundary of the fractional part of the skew estimate at +d or −d.

In operation 804, an initial skew estimate is computed based on LPOS sync-pattern detection flags obtained by servo channels processing servo signals read from the magnetic tape medium. This initial skew estimate may be used in the skew estimations taken for each TBS frame, by adding the integer part of this initial skew estimate to the fractional part taken for each servo burst.

In one approach, the LPOS sync-pattern detection flags are only used to compute the initial skew estimate, and not to compute the fractional parts taken more than once per TBS frame.

According to one approach, the LPOS sync-pattern detection flags may be detected using servo channels processing servo signals read by the magnetic tape read head.

Method 800, in one embodiment, includes computing four skew estimates per TBS frame, and determining time instants to compute the four skew estimates per TBS frame based on counting dibit correlation peaks of a [4 4 5 5] TBS pattern yielded by the synchronous servo channels to provide one skew estimate per servo burst.

In one approach, the more than one skew estimate may yield a skew error that is computed based on skew reference values, the skew reference values being selected from a range of $[-\lambda, \lambda]$, with $\lambda$ being a value greater than half a servo frame length (d). Moreover, in another approach, the more than one skew estimate may be defined as a sum of an integer part given by an integer number of servo frame lengths, and a fractional part given by a term in a range of $[-d, d]$. The fractional part may be computed multiple times per each servo frame.

The methods for skew estimation described herein in various embodiments ensure that the skew is correctly estimated over a wide range of skew values, thus enabling skew-following control for any value of the skew reference, to compensate large offsets in the position of the head modules, to increase margin allocated for tape dimensional stability, and to mitigate disturbances in the track-following loop arising from compressional tape vibration modes.

The methods may also be readily applied for skew compensation in legacy LTO drives, where the reference in the skew-following loop needs to take into account the presence of the shift in the servo pattern for servo band identification.

With these approaches, up to four skew estimates may be generated per servo frame. This is achieved by interleaving the generation of the skew estimates using four reference counter values, i.e., one per servo burst, to determine the start of an observation frame, and selecting appropriate shifts of the values of the counters modulo-18 to set the observation and the measurement flags. Therefore, the methods for skew estimation described herein in various embodiments allow an increase of up to a factor of four in the rate of generation of skew estimates with respect to conventional approaches.

The methods for skew estimation described herein in various embodiments have been described using an exemplary embodiment based on a synchronous servo channel that utilizes a correlation technique to detect the arrival times of the dibits in the servo readback waveform and the LPOS encoding scheme. However, it would be readily apparent to one of ordinary skill in the art that the methods may be adapted to tape systems that utilize other detection methods for the servo channel, such as peak detection, or that utilize other aspects of the LPOS encoding or alternative LPOS encoding schemes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic, software logic such as firmware, part of an operating system, part of an application program, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape drive, comprising:
   a magnetic tape read head providing at least two readback signals; and
   a controller comprising a processor and logic integrated with and/or executable by the processor, the logic being configured to:
   compute more than one skew estimate within each timing-based servo (TBS) frame, each skew estimate being related to an estimated position of the magnetic tape read head in relation to a magnetic tape medium.

2. The tape drive as recited in claim 1, wherein the more than one skew estimate has a value that depends on boundary crossings, wherein each boundary crossing is defined based on peaks of correlation signals generated by synchronous servo channels receiving the at least two readback signals.

3. The tape drive as recited in claim 2, wherein a boundary crossing occurs each time a difference between the peaks of correlation signals yields a skew estimate equal in absolute value to a length of one half a servo frame length (d).

4. The tape drive as recited in claim 1, wherein the logic is further configured to compute an initial skew estimate based on longitudinal position (LPOS) sync-pattern detection flags.

5. The tape drive as recited in claim 4, with the proviso that the LPOS sync-pattern detection flags are only used to compute the initial skew estimate.

6. The tape drive as recited in claim 4, wherein the at least two readback signals are processed by servo channels, the servo channels being configured to detect the LPOS sync-pattern detection flags using the at least two readback signals.

7. The tape drive as recited in claim 6, wherein N skew estimates are computed per TBS frame, N being greater than one, wherein time instants to compute the N skew estimates per TBS frame are determined based on counting dibit correlation peaks of a TBS pattern with N servo bursts in the servo channels to provide one skew estimate per servo burst.

8. The tape drive as recited in claim 1, wherein the more than one skew estimate is used to compute a skew error signal based on skew reference values, the skew reference values being selected from a range of $[-\lambda, \lambda]$, with $\lambda$ being a value greater than half a servo frame length (d).

9. The tape drive as recited in claim 8, wherein the more than one skew estimate is defined as a sum of an integer part given by an integer number of servo frame lengths, and a fractional part given by a term in a range of $[-d, d]$.

10. A method, comprising:
computing more than one skew estimate within each timing-based servo (TBS) frame, each skew estimate being related to an estimated position of a magnetic tape read head in relation to a magnetic tape medium.

11. The method as recited in claim 10, wherein the more than one skew estimate has a value that depends on boundary crossings, wherein each boundary crossing is defined based on peaks of correlation signals generated by synchronous servo channels receiving at least two readback signals.

12. The method as recited in claim 11, wherein a boundary crossing occurs each time a difference between the peaks of correlation signals yields a skew estimate equal in absolute value to a length of one half a servo frame length (d).

13. The method as recited in claim 10, further comprising computing an initial skew estimate based on longitudinal position (LPOS) sync-pattern detection flags obtained by servo channels processing servo signals read from the magnetic tape medium.

14. The method as recited in claim 13, with the proviso that the LPOS sync-pattern detection flags are only used to compute the initial skew estimate.

15. The method as recited in claim 13, wherein the LPOS sync-pattern detection flags are detected using servo channels which process at least two readback signals provided by the magnetic tape read head.

16. The method as recited in claim 15, wherein N skew estimates are computed per TBS frame, N being greater than one, and further comprising determining time instants to compute the N skew estimates per TBS frame based on counting dibit correlation peaks of a TBS pattern in the servo channels to provide one skew estimate per servo burst.

17. The method as recited in claim 10, wherein the more than one skew estimate is used to compute a skew error signal based on skew reference values, the skew reference values being selected from a range of $[-\lambda, \lambda]$, with $\lambda$ being a value greater than half a servo frame length (d).

18. The method as recited in claim 17, wherein the more than one skew estimate is defined as a sum of an integer part given by an integer number of servo frame lengths, and a fractional part given by a term in a range of $[-d, d]$.

19. A system, comprising:
a hardware processor and logic integrated with and/or executable by the hardware processor, the logic being configured to cause the hardware processor to:
compute an initial skew estimate based on longitudinal position (LPOS) sync-pattern detection flags detected using servo channels which process at least two readback signals, with the proviso that the LPOS sync-pattern detection flags are only used to compute the initial skew estimate; and
compute more than one skew estimate within each timing-based servo (TBS) frame thereafter, each skew estimate being related to an estimated position of a magnetic tape read head in relation to a magnetic tape medium.

20. The system as recited in claim 19,
wherein the more than one skew estimate has a value that depends on boundary crossings,
wherein each boundary crossing is defined based on peaks of correlation signals generated by synchronous servo channels receiving the at least two readback signals,
wherein a boundary crossing occurs each time a difference between the peaks of correlation signals yields a skew estimate equal in absolute value to a length of one half a servo frame length (d),
wherein N skew estimates are computed per TBS frame, N being greater than one, and
wherein time instants to compute the N skew estimates per TBS frame are determined based on counting dibit correlation peaks of a TBS pattern in servo channels to provide one skew estimate per servo burst.

* * * * *